United States Patent
Freeman

(10) Patent No.: US 7,198,333 B1
(45) Date of Patent: Apr. 3, 2007

(54) COMPACTOR CLEAT FOR LAND VEHICLES

(76) Inventor: Ernie Freeman, 3467 Kings Mill Run, Rocky River, OH (US) 44116

( * ) Notice: Subject to any disclaimer, the term of this patent is extended or adjusted under 35 U.S.C. 154(b) by 0 days.

(21) Appl. No.: 11/482,387

(22) Filed: Jul. 7, 2006

Related U.S. Application Data

(63) Continuation of application No. 10/382,958, filed on Mar. 6, 2003, now abandoned.

(51) Int. Cl.
B60B 15/02 (2006.01)
E01C 19/26 (2006.01)

(52) U.S. Cl. .................. 301/43; 301/44.3; 404/121
(58) Field of Classification Search .............. 301/43, 301/44.3, 44.4; 404/112, 116, 117, 121
See application file for complete search history.

(56) References Cited

U.S. PATENT DOCUMENTS

| | | | |
|---|---|---|---|
| 1,011,001 A | 12/1911 | Wright | |
| 3,687,023 A | 8/1972 | Moser et al. | 94/50 |
| 3,718,170 A | 2/1973 | Caron et al. | 152/49 |
| 3,822,957 A | 7/1974 | Caron et al. | 404/121 |
| 3,823,983 A | 7/1974 | Peterson | 301/43 |
| 3,891,341 A | 6/1975 | Trainor et al. | 404/121 |
| 3,922,106 A | 11/1975 | Caron et al. | 404/121 |
| 4,530,620 A | 7/1985 | McCartney | 404/121 |
| 4,668,122 A | 5/1987 | Riddle | 404/121 |
| 4,750,792 A | 6/1988 | Caron et al. | 305/54 |
| 4,865,400 A | 9/1989 | Caron et al. | 305/54 |
| 4,919,566 A | 4/1990 | Caron et al. | 404/121 |
| H946 H | 8/1991 | Lonn | 404/121 |
| 5,217,321 A | 6/1993 | Corcoran et al. | 404/121 |
| D338,898 S | 8/1993 | Corcoran et al. | D15/28 |
| D339,593 S | 9/1993 | Johansson | D15/29 |
| 5,358,355 A | 10/1994 | Brockway | 404/121 |
| D352,044 S | 11/1994 | Hahn | D15/29 |
| D379,630 S | 6/1997 | Brockway | D15/29 |
| 5,769,507 A | 6/1998 | Brockway | 301/43 |
| 6,095,717 A | 8/2000 | Kaldenberg et al. | 404/121 |
| 6,273,516 B1 | 8/2001 | Brockway | 301/143 |
| D453,940 S | 2/2002 | McCartney | D15/528 |

OTHER PUBLICATIONS

Caron Compactor Company, "This Trials and Tribulations of Four Generations of CAT Plus Pin-On Designs in 1-½ Years", Advertisement, Mar. 1992.
Caron Compactor Company, "Announces The Caron Exclusive "Z" Cleat", Advertisement.
Caterpillar, Ground Engaging Tools, Caterpillar Long-Life Weld-On Plus Tips and Abrasion Resistant Material (A.R.M.), 1996, Advertisement.
Caterpillar, Ground Engaging Tools, "Caterpillar Landfill Compactor Tip for Traction Applications", Advertisement.
Freeman Equipment, Inc., "Get A Grip", Promotional Postcard, 1998.

Primary Examiner—Jason R. Bellinger
(74) Attorney, Agent, or Firm—Pearne & Gordon LLP

(57) ABSTRACT

A cleat for compacting refuse at a landfill by use on the wheels of a compactor or on the shoes of a crawler-type tractor. The cleat has a prismatic modified Z or S configuration that affords superior compaction performance by increasing traction and thereby reducing churning of already compacted material. The flanges of the cleat create traction pockets on opposite sides so that the cleat is effective in either direction of the compactor or tractor.

11 Claims, 5 Drawing Sheets

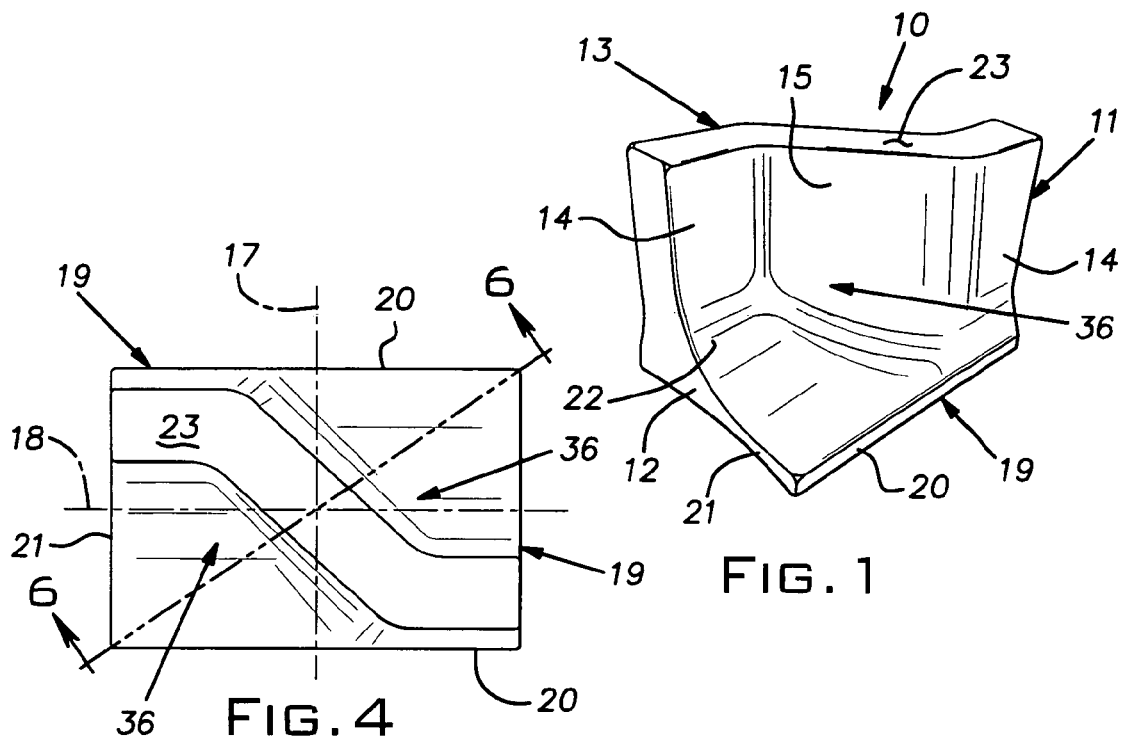
FIG. 1
FIG. 4
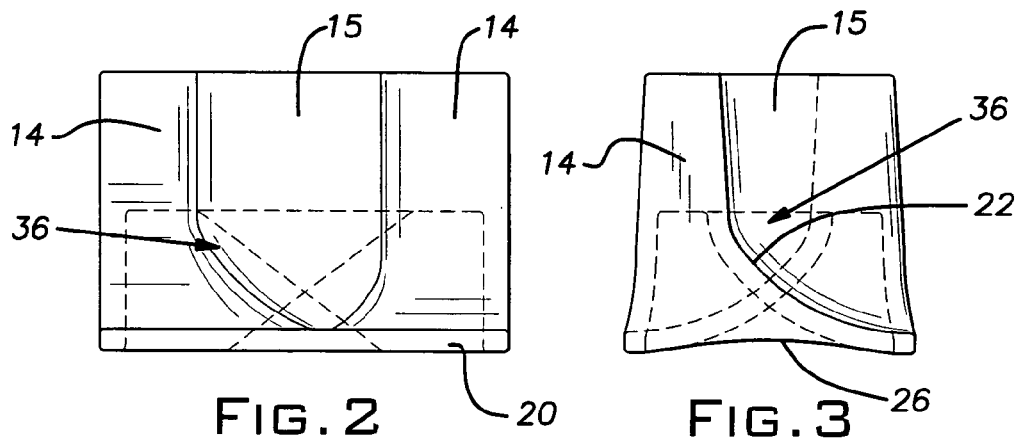
FIG. 2
FIG. 3
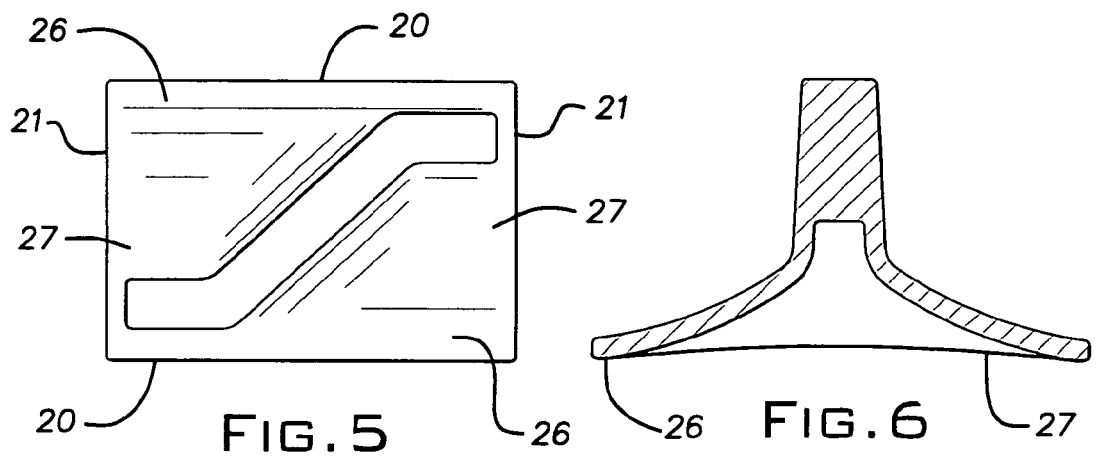
FIG. 5
FIG. 6

U.S. 7,198,333 B1

COMPACTOR CLEAT FOR LAND VEHICLES

This application is a continuation of Ser. No. 10/382,958, filed Mar. 6, 2003 now abandoned.

BACKGROUND OF THE INVENTION

The invention relates to improvements in compactor cleats, particularly suited for landfill operations.

PRIOR ART

Landfill space is most valuable where it is most needed, e.g. where an area is densely populated. As a population center grows, the land area it needs for residential, commercial, industrial and recreational space increases. Simultaneously, the increase in population produces a proportionate increase in waste. With less land available and more waste being generated, the need to use landfill space efficiently becomes greater if not urgent. To improve the volumetric efficiency of a landfill, it has become the practice to compress the waste dumped there by repeatedly running over it with large wheeled tractors or "compactors" or with track mounted tractors or crawlers. These tractors have features designed particularly for this purpose. The wheeled tractors are fitted with heavy all-steel wheels that include cleats intended to compress the waste by concentrating the weight of the tractor on the relatively small area of the cleats. Various types and geometries of cleats have been proposed for this service but there has remained a need for increasingly more efficient compactor cleats.

SUMMARY OF THE INVENTION

The invention provides a compactor cleat for a wheel or a track pad that has improved compaction performance compared to other known cleats. On a wheel, the cleat increases the rate and degree of compaction by reducing wheel spinning that otherwise results from loss of traction. By maintaining traction, the cleat of the present invention avoids churning up and in effect decompacting waste material that has already been compacted by the current and any previous passes of the wheels on the landfill area being treated.

The cleat of the invention is characterized by a bi-directional pocket geometry enabling a compactor to work well in both forward and reverse directions. As disclosed, the cleat is symmetrically arranged with gripping pockets on its forward and rearward faces. The pockets have a width in the axial direction of a wheel to which it is attached that is at least ½ of the width of the cleat and, preferably, is even greater. Further, this width is preferably about the same as the height of the cleat measured in the radial direction. In either direction, the cleats have broad leading faces that avoid leading edges which can cut into the waste material being compacted and thereby diminish traction. Ideally, for at least half of the height of the cleat, its pocket faces are generally radially oriented. The cleats are spaced on a wheel on centers along circumferential lines with the cleat centers of adjacent lines being staggered or out of phase. Preferably, the collective width of the cleats in the axial direction on a wheel is about equal to the width of a wheel.

BRIEF DESCRIPTION OF THE DRAWINGS

FIG. 1 is a perspective view of a first embodiment of a clear constructed in accordance with the invention;
FIG. 2 is a front elevational view of the cleat of FIG. 1;
FIG. 3 is a side elevational view of the cleat of FIG. 1;
FIG. 4 is a plan view of the cleat of FIG. 1;
FIG. 5 is a bottom view of the cleat of FIG. 1;
FIG. 6 is a cross-sectional view of the cleat taken in the plane indicated by the lines 6—6 in FIG. 4.

DESCRIPTION OF THE PREFERRED EMBODIMENTS

Figure 7:
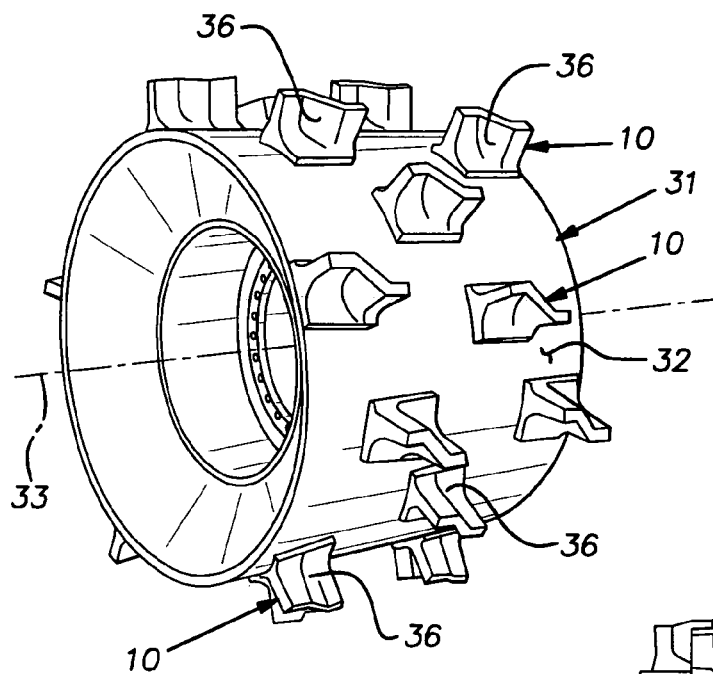
FIG. 7 is a perspective view of a typical compactor wheel on which is mounted a plurality of cleats of the type illustrated in FIG. 1.

Referring now to the drawings and, in particular, to FIGS. 1–6 there is illustrated an example of a cleat 10 constructed in accordance with the invention. The illustrated cleat 10 which can be made in one piece of steel and cast to shape has a main body 11 and a mounting base 12. The main body 11 includes a generally prismatic Z-shaped formation 13. The Z-shape is somewhat unfolded from a traditional shape in that opposed flanges 14 are displaced from one another along their planes so that a web 15 forms an obtuse angle with each of the flanges 14. As illustrated, the flanges 14 are preferably planar and parallel to one another. A study of FIG. 4 reveals that the prismatic portion 13 of the body 11 is symmetrical about two perpendicular planes that are each perpendicular to the plane of the figure and are indicated by the lines 17, 18. The base 12 as viewed in FIGS. 4 and 5 is generally rectangular having a perimeter 19 with opposed long sections 20 and opposed short sections 21. The flanges 14 are each adjacent one of the long sections 20 of the base perimeter 19 and are distal from the perimeter section to which the opposed flange is adjacent. The thickness of the flanges 14 and web 15, as shown, can be uniform. These flange and web elements 14, 15 can be, as mentioned, generally prismatic except for a nominal draft angle to facilitate casting of the cleat 10.

As shown in FIG. 3, for example, a large fillet 22 is provided between each flange 14 and the distal base perimeter section 21. The fillet serves to avoid a "tight" corner between the flange 14, and portions of the web 15, and the base 12 which could otherwise accumulate waste material and reduce the pressure that the cleat 10 can produce on the waste at its outer face 23. The outer face 23 is common to the flanges 14 and web 15 of the prismatic Z-shaped portion 13 and can be generally planar and perpendicular to the imaginary planes that are perpendicular to the plane of FIG. 4 through the lines 17, 18. A bottom or inner face 26 of the base 12 is concave so as to provide surface areas that work in the manner of a saddle to enable the cleat 10 to set on and align with the outer surface of a cylindrical wheel as described hereinbelow. This alignment afforded by the surface areas of the inner face 26 of the base 12 puts the mid-plane, represented by the line 18 in FIG. 4 of the prismatic body portion 13 in alignment with an imaginary radial plane parallel to and passing through the axis of a cylindrical wheel on which the cleat is mounted. The alignment surface areas can include, as shown, a cylindrical area 27 at opposed perimeter sides 21 of the base 12. The radius of the cylindrical surface areas 27 is preferably equal to or slightly less than the radius of the outside diameter of a wheel on which the cleat is to be attached. A typical outside diameter of a wheel is between about 40" to 60". It will be understood by those skilled in the art that the base can provide contact areas for saddling and aligning onto the outside diameter of a wheel that are not cylindrical and that at a minimum provide three points of contact, one adjacent one of the long perimeter sides 20, and two adjacent the opposite long perimeter sides 20. It is desirable that the contact areas and other parts of the base are configured so that a major portion, if not all, of the perimeter 19 lies close to the cylindrical surface of the wheel, e.g. within ⅜ inch so that one or two passes of a welding rod or wire is adequate to completely form an adequate weld fillet along the perimeter 19 of the base 12.

Figure 8:
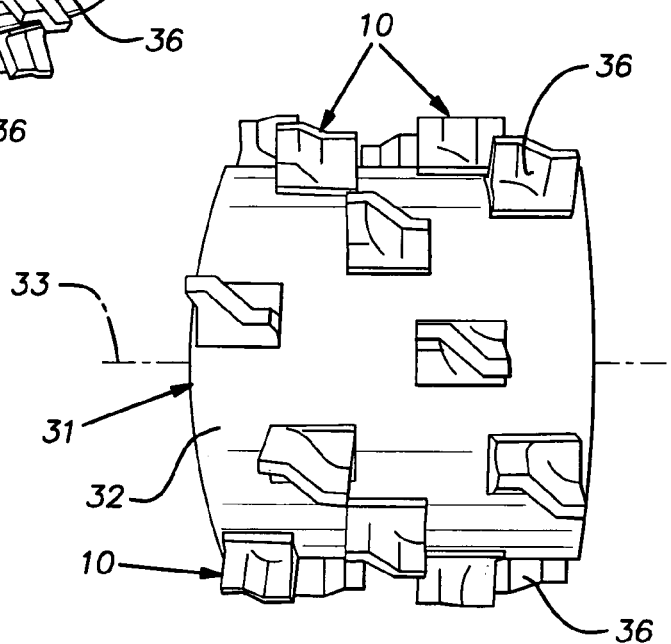
FIG. 8 is a front perspective view of the wheel and cleats of FIG. 7.

FIGS. 7 and 8 illustrate application of the inventive cleat on a compactor wheel 31. The wheel 31 along with three similar units are assembled on a tractor or compactor that operates back and forth along a landfill to crush, compact and otherwise densify debris or waste to conserve the landfill volume. A plurality of cleats 10 are welded on the outer cylindrical ground engaging surface port of the wheel 31 in a generally known manner. Preferably, the cleats 10 are arranged with a uniform arcuate or circumferential spacing in circumferential rows. Preferably, the cleats 10 of adjacent rows are out of angular alignment or phase with one another.

From the foregoing it will be understood that the cleats 10 when properly located on the cylindrical wheel surface by the saddle or locating surfaces represented by the cylindrical surface areas 27 and welded in place are each generally aligned both radially and axially with respect to an axis 33 of the wheel.

It will be seen that the cleat 10, once welded to the wheel 31 is very stable and rugged, owing to its disclosed geometry. The width of the illustrated cleat 10 measured in a direction parallel to the planes of the flanges 14 is greater than the height of the cleat while the length measured in the direction perpendicular to the planes of the flanges is about the same as the height. The illustrated cleat 10, by way of example, has nominal dimensions of 7" height, 10" width, and 7" length. The flanges 14 interconnected by the web 15 create a very stiff, robust structure not readily damaged or knocked off a wheel.

The cleat 10 creates a pocket 36 in the convex space between the trailing flange 14 with reference to the direction of rotation of the wheel 31, the web 15 and the fillet 22. This pocket 36 has demonstrated improved traction capability, operating in concert with the identical cleats on the associated wheel and the other wheels of a compactor. While no complete explanation is presently known for the improved traction performance of the disclosed cleat 10, it has been theorized that the pocket 36 works something like a cupped hand used by a swimmer to increase coupling with the water. That is to say, it is believed that the pocket 36 increases traction over what would be available from a simple flat or plate-like cleat. Additionally, the blunt faces of the flanges 14 and web 15, unlike other prior art cleat designs, avoid shearing the material being compacted to thereby afford a better, more stabilized grip in the material being compacted. Because the cleat 10 is symmetrical about the radial plane associated with the line 18, it has the same characteristics with a pocket and blunt flange and web faces on both of its faces. Consequently, the cleat is bi-directional in its effectiveness when the compactor is going forward or rearward.

Figure 9:
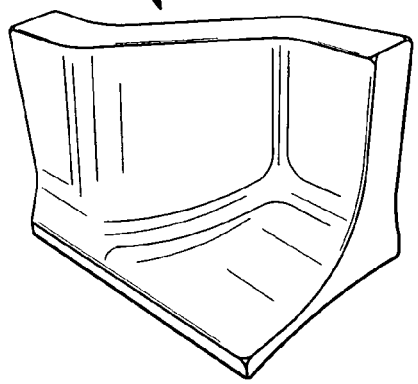
FIG. 9 is a perspective view of a modified form of the cleat, being a mirror image of the cleat of FIG. 1.
Figure 10:
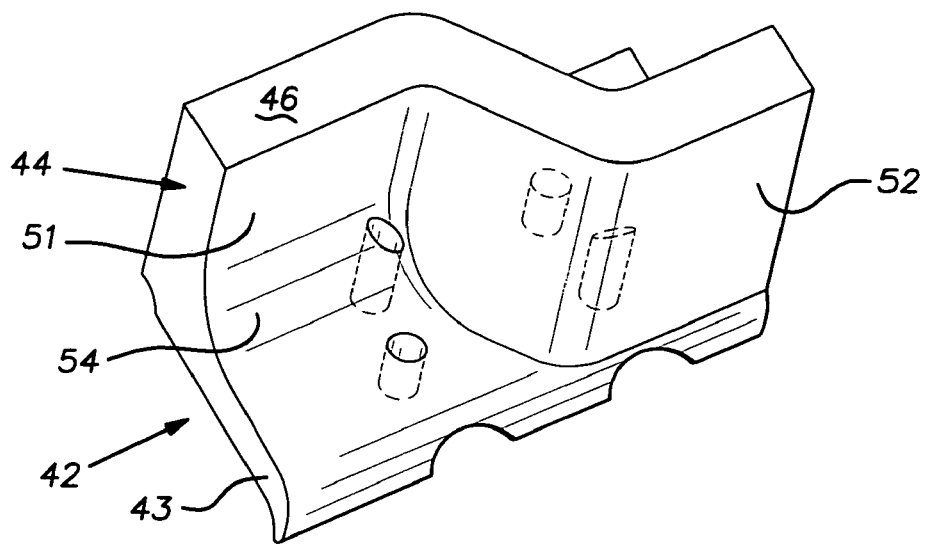
FIG. 10 is a perspective view of a second embodiment of a cleat constructed in accordance with the invention.

It has been found that the same style cleat 10 can be used on wheels mounted on both the right and left side of a machine or tractor without experiencing any significant side thrust. It is contemplated that the cleat of the invention can be modified by making it as an S-version or, more properly, an unfolded S-version where the flanges are offset from one another in their planes. This version of a cleat 110 is shown in FIG. 9. If desired, a compactor can be arranged with all Z-cleats on the wheels on one side and all S-cleats on the wheels of the opposite side. Alternatively, each wheel can have a mixed arrangement of Z and S cleats. While the flanges 14 and web 15 have been shown with flat and angular features, it is contemplated that certain of these features can be modified while the traction pocket 36 is retained. Such modification can include the use of moderately curvilinear surfaces or profiles.

Figure 11:
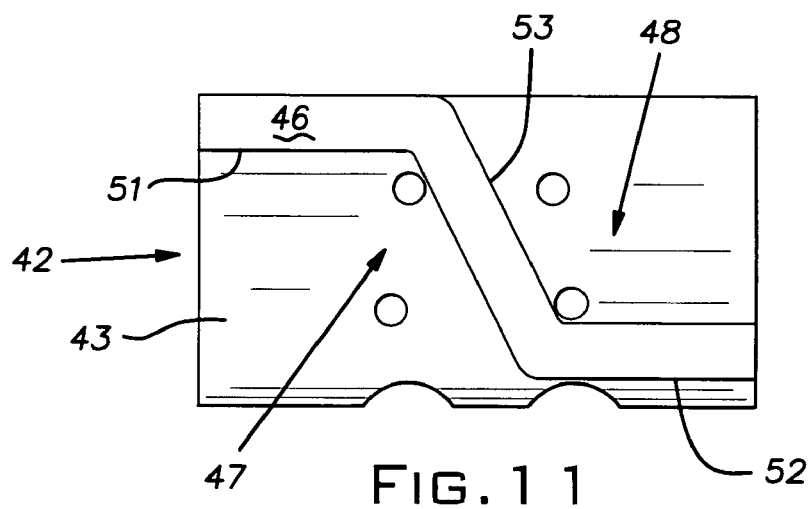
FIG. 11 is a plan view of the cleat of FIG. 10.
Figure 12:
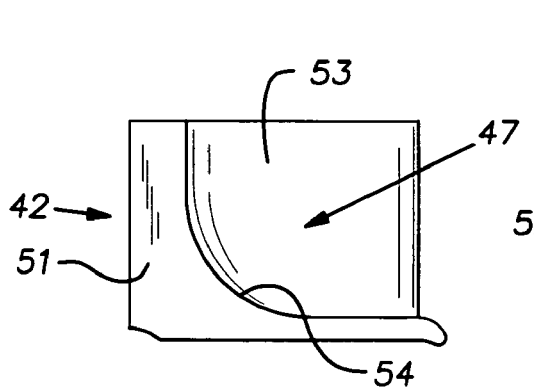
FIG. 12 is a side elevational view of the cleat of FIG. 10 taken from the left.
Figure 13:
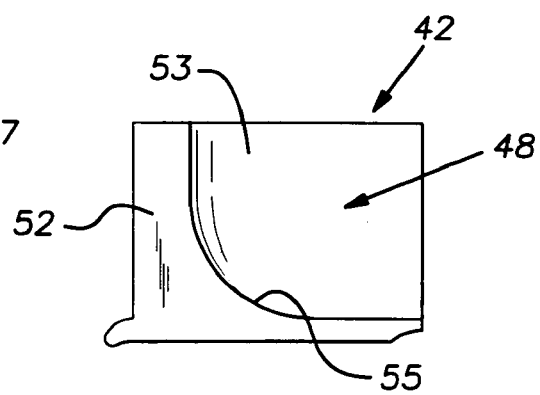
FIG. 13 is a side elevational view of the cleat of FIG. 10 taken from the right.
Figure 14:
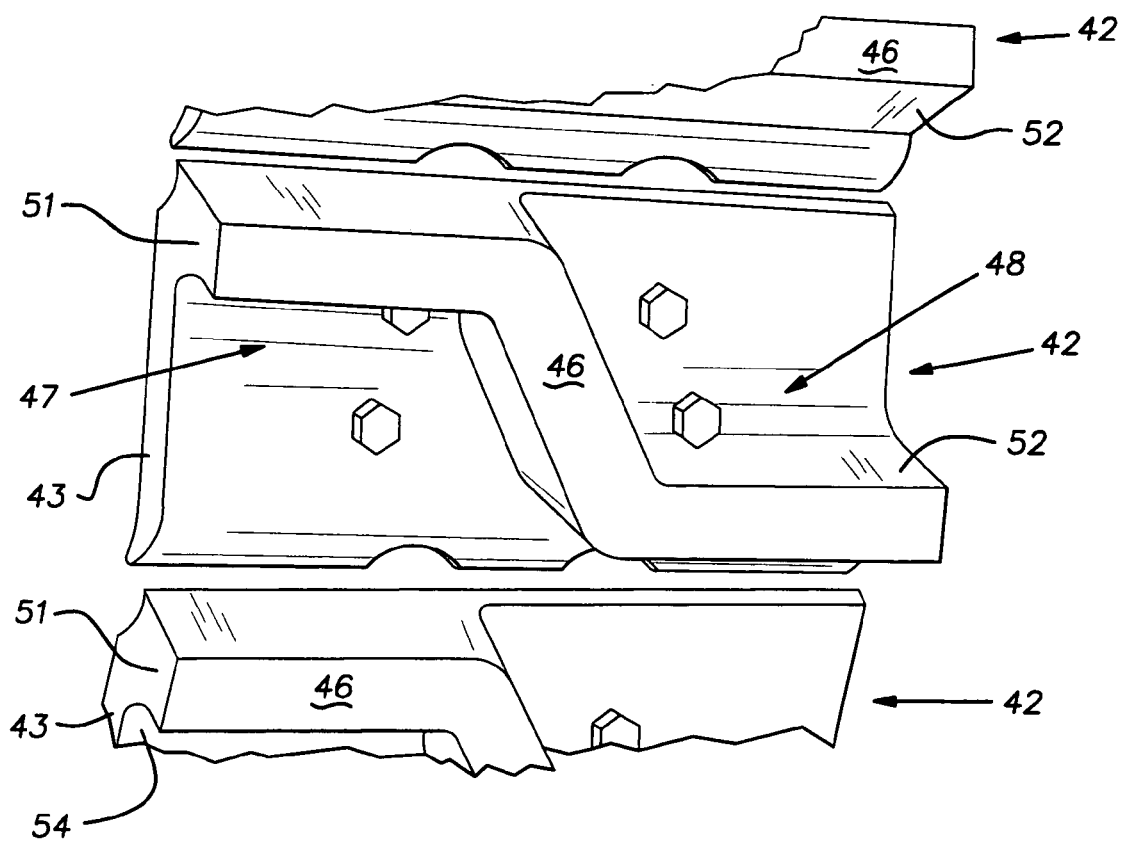
FIG. 14 is a fragmentary perspective view of a succession of three cleats bolted to an endless track.
Figure 15:
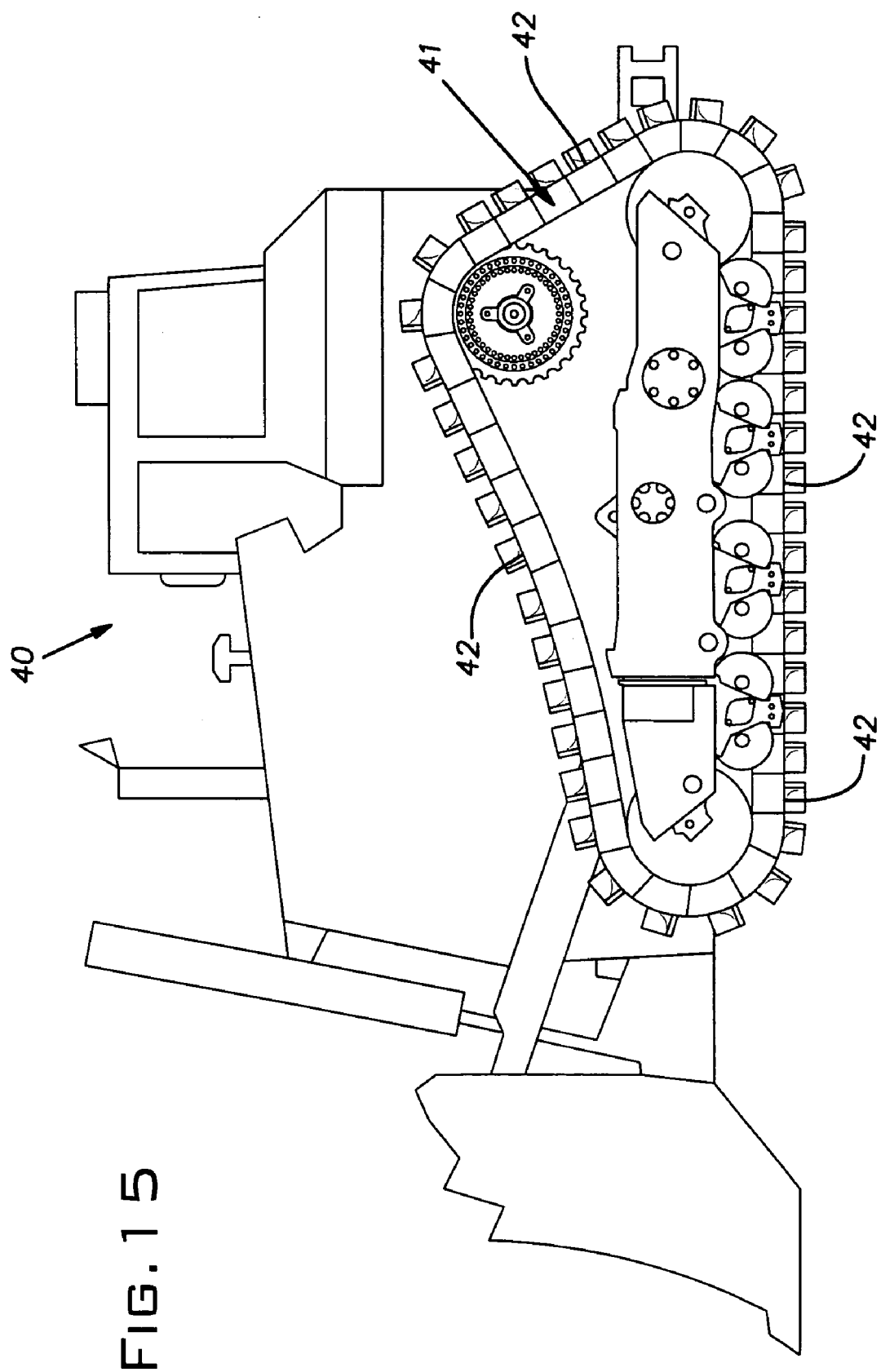
FIG. 15 is a side view of a crawler type tractor on which the cleats of FIG. 10 are employed.

FIGS. 10–15 illustrate another embodiment of the invention as it is applied to a track or crawler-type vehicle 40. The illustrated vehicle 40 is fitted with a pair of endless track chains 41, one on each side of the machine as is conventional. Bolted to the track chain are shoes or pads 42 constructed in accordance with the invention. The shoes or ground engaging parts 42 on each track chain 41 can be identical. A shoe, which can be constructed of cast steel, has a base 43 which is generally rectangular in plan view as shown in FIG. 11. The shoes 42 include a cleat 44 integral with a base 43 which in the illustrated example, has a stretched Z-shape. A study of FIGS. 12 and 13 show that the cleat 44 has an upper face 46 that, preferably, lies in a plane parallel to the base 43.

For reference purposes, the length of the shoe base 43, measured in the direction of travel, can range between about 6½" to about 10¼" and the width of the shoe base can range between about 14" and about 36". The cleat 44 has a height above the base 43 of about 3", for example. The cleat 44 has self-cleaning traction pockets 47, 48 for forward and rearward operation of the crawler or tractor 40. Each pocket 47, 48 exists in a zone bound by a flange 51 or 52 and a web 53, forming an obtuse angle therebetween and a concave fillet surface 54 or 55. The fillet surface 54, 55, making a smooth transition between the base 43 and flange 51, 52 reduces the risk that refuse will become severely lodged in the respective pocket 47, 48.

As with the cleat 10 described in connection with FIGS. 1–9, the cleat 44 is bi-directional with the pocket 47 operating to improve traction in the forward direction of the crawler or machine 40 and the pocket 48 operating to improve traction in the rearward direction. At the same time, the shoes 42 increase the compaction of waste or other material by increasing the pressure that the shoes develop at the relatively small area of the cleat face 46, as compared to the plan area of the shoe.

As discussed previously in connection with the cleat 10, the cleat 44 can have its flanges 51, 52 and web 53 modified into curvilinear shapes, as desired. Additionally, the cleat 44 can be made in a configuration that is a mirror image so that it has the shape of a stretched S. Z and S cleats can be used on opposite sides of the crawler 40 and/or can be used alternately on the same side of the machine.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

What is claimed is:

1. A compactor cleat on a ground engaging surface part of a wheel or track of a land vehicle that moves in a recirculating path relative to the vehicle as the vehicle is propelled over the ground, to compact material on the ground, the cleat projecting in a direction generally perpendicular to the ground engaging surface part and having a stretched prismatic Z or S configuration when viewed in a plane generally parallel to the ground engaging surface part and normal to said perpendicular direction, the configuration having spaced, in the direction of movement, generally parallel and planar opposed flanges and a web interconnecting said flanges, the cleat being arranged such that as the ground engaging surface part moves along said path, the flanges are oriented with their planes substantially perpendicular to the direction of movement.

2. A cleat as set forth in claim 1, including a fillet disposed between each flange and an imaginary extension of the plane of the opposed flange.

3. A compactor cleat of a single piece of cast steel for welding onto the periphery of a cylindrical wheel, the cleat having a mounting face with surface areas complimentary to an imaginary cylinder corresponding to the periphery of the wheel such that a majority of the perimeter of the face is sufficiently close to the wheel perimeter to facilitate welding with one or a few passes with a welding rod or wire, a main body extending generally radially with respect to the axis of the imaginary cylinder and being symmetrical about an imaginary plane parallel to and passing through the axis of the imaginary cylinder, the body having a pocket area on each side of said imaginary plane, each pocket area being formed by first surface areas that are generally parallel to the imaginary plane and that have generally radial planes aligned relative to said imaginary axis and second surface areas that lie at angles to said first surface areas, said first and second surface areas presenting the shape of a stretched, upright Z or S when viewed in a vertical plane with the cylindrical wheel periphery lying on the ground.

4. A cleat as set forth in claim 3, wherein said first and second surface areas are symmetrical to a plane transverse to the axis of the imaginary cylinder.

5. A cleat as set forth in claim 3, including mounting surface areas formed by a base integral with said main body.

6. A cleat as set forth in claim 5, wherein the main body and base have a height and the base has circumferential and axial dimensions with reference to said imaginary cylinder that are generally at least as large as said height.

7. A compactor wheel concentric with an axis and having a cylindrical outer surface, a plurality of cleats welded on the periphery of the wheel at spaced locations, the cleats extending generally radially from the outer surface and having a radially outer configuration when viewed along a radial line that has the form of an unfolded Z or S, opposed flange portions of the profile being generally parallel to an imaginary plane passing through the axis of the wheel.

8. A wheel as set forth in claim 7, wherein said cleats have cross-sections substantially the same as their outer profile, such that they are generally prismatic.

9. A wheel as set forth in claim 8, wherein said cross-sections, remote from said cylindrical surface, comprise about at least one-half of the height of a cleat.

10. A wheel as set forth in claim 9, wherein said cleats have integral bases substantially at least as large as their height in the circumferential direction and in the axial direction.

11. A wheel as set forth in claim 10, wherein the cleat base has the general form of a rectangle when viewed in a radial direction and said flanges are faired into the base with a fillet, one of said flanges being adjacent one side of the rectangle of the base and remote from the opposite side of the rectangle, the other flange being remote from the one side and adjacent the opposite side, a fillet disposed between each of said flanges and the side remote from it, the fillet rising a substantial distance above a margin of the base and thereby avoiding a sharp corner between the base and respective flange and reducing the risk of the accumulation of waste material in this area.

* * * * *